United States Patent Office 3,114,745
Patented Dec. 17, 1963

3,114,745
METALLIZED AZO DYESTUFFS
Frank Lodge and Cyril Eric Vellins, Blackley, Manchester, England, assignors to Imperial Chemical Industries Limited, London, England, a corporation of Great Britain
No Drawing. Filed Oct. 3, 1960, Ser. No. 59,851
Claims priority, application Great Britain Oct. 12, 1959
2 Claims. (Cl. 260—147)

This invention relates to new dyestuffs. More particularly the invention relates to new dyestuffs capable of dyeing textile materials, particularly wool, silk and synthetic polyamide fibres in shades of extremely high fastness to washing.

According to the invention, there are provided dyestuffs of the azo (including metallized azo), anthraquinone and o-nitrodiphenylamine series, which are free from sulphonic acid groups and from carboxylic acid groups which do not form part of a metal complex system, which dyestuffs are characterised by the presence, attached to a carbon atom of the dyestuff, of a group of the formula:

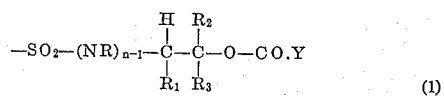

(1)

wherein R stands for a hydrogen atom or an alkyl, substituted alkyl, cycloalkyl, aralkyl, aryl or substituted aryl radical, $R_1$, $R_2$ and $R_3$ independently stand for hydrogen or for lower alkyl groups, $n$ stands for 2 or, preferably, 1 and Y stands for a hydrocarbon or substituted hydrocarbon radical.

As examples of alkyl radiacls which may be represented by R in the above formula, there may be mentioned in particular, lower alkyl radicals such as methyl, ethyl, propyl and butyl.

As examples of substituted alkyl radicals which may be represented by R in the above formula, there may be mentioned substituted lower alkyl radicals, preferably acyloxy lower alkyl radicals in which the acyl group is identical with that represented by CO.Y. Thus where Y represents methyl, R may represent, for example, β-acetoxyethyl, γ-acetoxypropyl or β:γ-diacetoxypropyl.

As examples of aryl radicals which may be represented by R in the above formula there may be mentioned monocyclic hydrocarbon radicals such as phenyl, tolyl and as examples of substituted aryl radicals which may be represented by R in the above formula, there may be mentioned radicals of the benzene series such as chlorophenyl.

As examples of cycloalkyl radicals there may be mentioned cyclohexyl and as an example of aralkyl radicals there may be mentioned benzyl.

As examples of lower alkyl groups which may be represented by $R_1$, $R_2$ or $R_3$ in the above formula there may be mentioned methyl and ethyl.

As examples of hydrocarbon radicals which may be represented by Y in the above formula there may be mentioned alkyl radicals such as methyl, ethyl, n-propyl and isopropyl, alkenyl radicals such as vinyl and α- and β-methylvinyl, cycloalkyl radicals such as cyclohexyl, aralkyl radicals such as benzyl and naphthyl-methyl and mono- and di-cyclic aryl radicals such as phenyl, naphthyl and tolyl.

As examples of substituted hydrocarbon radicals which may be represented by Y, there may be mentioned halogeno-lower alkyl such as chloromethyl, dichloromethyl, trichloromethyl and β-chloropropyl, acyl-lower alkyl such as acetylmethyl, and radicals of the benzene series such as methoxyphenyl, nitrophenyl and chloro-phenyl.

The grouping of Formula 1 above is attached to a carbon atom of the dyestuff. This atom may, for example form part of an aromatic carbocyclic or heterocyclic nucleus, or may itself be attached to an aromatic nucleus of the dyestuff either directly or by a chain of atoms, which need not all be carbon atoms, which atoms may form part of a non-aromatic ring. The said carbon atom preferably forms part of a benzene or naphthalene nucleus.

According to a further feature of the invention, there is provided a process for manufacture of the new dyestuffs which comprises reacting a dyestuff of the azo, anthraquinone or o-nitrodiphenylamine series which is free from sulphonic acid groups and from carboxylic acid groups which do not form part of a metal complex system, which dyestuff contains a group of the formula:

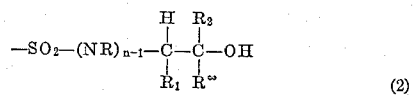

(2)

wherein R, $R_1$, $R_2$, $R_3$ and $n$ have the meanings stated above, with a monobasic carboxylic acid of formula $Y.CO_2H$ or a derivative thereof which may be used as an acylating agent such as the anhydride or acid halide of such an acid.

As examples of monobasic organic carboxylic acids of formula $Y.CO_2H$ there may be mentioned acetic acid, propionic acid, butyric acid, acrylic acid, methacrylic acid, crotonic acid, benzoic acid, chloroacetic acid, methoxybenzoic acid, nitrobenzoic acid, chlorobenzoic acid, phenyl acetic acid, toluic acid, cyclohexanecarboxylic acid, dichloroacetic acid, trichloroacetic acid, β-chloropropionic acid and acetoacetic acid.

The dyestuffs which contain the group of Formula 2 above may be obtained by a number of methods, for example, where $n=1$, by converting a dyestuff containing one or more sulphonchloride groups into the sulphinic acid or the alkali metal salt of such an acid and then reacting this product with β-chloroethyl alcohol or ethylene oxide. In this manner, hydroxy-compounds containing the group:

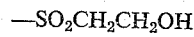

are obtained. If instead of β-chloroethyl alcohol or ethylene oxide, compounds containing the appropriate lower alkyl substituents are used, such as β-chloropropanol, propylene oxide, 1:2-butylene oxide or lower alkyl derivatives thereof, products are obtained containing the grouping:

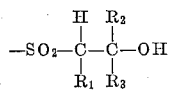

Starting materials of this kind can also be obtained by subjecting to oxidation a dyestuff containing the grouping:

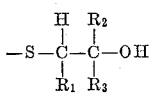

or

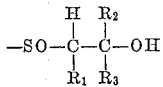

Where the symbol $n$ of Formula 2 stands for 2, the dyestuffs used as starting materials in the process of the invention may be obtained by reacting a dyestuff containing one or more sulphonchloride groups with a β-hydroxy alkylamine such as ethanolamine, N-methyl-, N-ethyl-, N-propyl- and N-butylethanolamine, N-phenyl-, N-tolyl-, N-(chlorphenyl)-, N-cyclohexyl and N-benzyl-ethanolamines, di-ethanolamine, N-(β:γ-dihydroxypropyl)ethanolamine and γ-hydroxypropyl-β-hydroxyethylamine.

Dyestuffs for use as starting materials in the above process of the invention may also be obtained by formation from intermediate compounds which may or may not themselves be coloured and which already contain the group of Formula 2 above. In the case of azo dyestuffs, the said group may be present once or several times in the diazo component or in the coupling component, or in both components; if necessary the product obtained is treated with an agent yielding metal to give a complex metal containing azo dyestuff. As examples of metals which may be used in such complex metal containing azo dyes may be mentioned manganese, vanadium, iron, nickel, copper and zinc and, preferably chromium and cobalt, and as examples of such agents yielding metal there may be mentioned chromium or cobalt halides for example the chlorides or fluorides, chromium or cobalt salts of aliphatic carboxylic acids for example formic or acetic acid, and mixture of chromium or cobalt salts with alkali metal salts of aliphatic hydroxycarboxylic acids for example tartaric acid, chromium complexes of aromatic orthohydroxy carboxylic acids for example salicylic acid, copper, manganese, zinc and nickel sulphates, cuprammonium sulphate, vanadyl sulphate and ferric chloride.

As examples of diazo components containing a group of Formula 2 above, there may be mentioned o-, m- and p-β-hydroxyethylsulphonyl anilines,
2-amino-4-β-hydroxyethylsulphonylphenol,
2-amino-4-β-hydroxyethylsulphamylphenol,
2-amino-4-(N-β-hydroxyethyl-N-methylsulphamyl)-phenol,
2-amino-4-(N-β-hydroxyethyl-N-ethylsulphamyl)-phenol,
2-amino-4-(N-β-hydroxyethyl-N-propylsulphamyl)-phenol,
2-amino-5-β-hydroxyethylsulphonyl phenol,
2-amino-5-(N-β-hydroxyethyl-N-ethylsulphamyl)-phenol,
4-(β-hydroxyethylsulphonyl)-anthranilic acid,
2-chlor-5-β-hydroxyethylsulphonyl aniline,
2-amino-4-(N-β-hydroxyethyl-N-phenylsulphamyl)-phenol,
2-amino-4-(N-β-hydroxyethyl-N-2'-chlorphenyl sulphamyl)-phenol,
m- and p-aminobenzenesulphon-N-β-hydroxyethylamide,
p-amino-benzenesulphon-N-(α:β-dimethyl-β-hydroxyethyl)-amide,
p-aminobenzenesulphon-N-(α-methyl-β-hydroxyethyl)-amide,
4-amino-3-chlorbenzenesulphon-N-β-hydroxyethylamide,
2-amino-5-nitrobenzenesulphon-N-β-hydroxyethylamide,
4-amino-3-chlorophenyl-β-hydroxyethyl sulphone,
4-amino-1-naphthyl-β-hydroxyethyl sulphone and
3-β-hydroxyethyl sulphonyl methyl-4-methyl aniline.

These diazo components may be coupled with coupling components which do not contain a group of Formula 2, for example, para-coupling amines of the benzene or naphthalene series such as N:N-dimethylaniline,
N:N-diethylaniline,
N:N-diethyl-m-toluidine,
N-ethyl-N-β-hydroxyethylaniline,
N:N-di-(β-hydroxyethyl)-m-toluidine,
N-ethyl-N-β-cyanoethylaniline,
N-β-hydroxyethyl-N-β'-cyanoethylaniline,
N:N-di(β-acetoxyethylaniline),
N:N-di(β-carboethoxyethyl)aniline,
N-β-cyanoethyl-N-β'-methoxyethylaniline,
3-N:N-di-(β-acetoxyethyl)aminoacetanilide,
N-β-hydroxyethylaniline and
N-β-hydroxyethyl-1-naphthylamine, other ortho-coupling amines such as 1-naphthylamine-4-sulphonamide,
2-naphthylamine-6-sulphonamide and
4-chloro-1-naphthylamine, keto-methylene compounds such as 1-(2'-methoxyphenyl)-3-methyl-5-pyrazolone,
1-phenyl-3-methyl-5-pyrazolone,
1-(2'-, 3'- or 4'-methylphenyl)-3-methyl-5-pyrazolone,
1-(2'-, 3'- or 4'-chlorphenyl)-3-methyl-5-pyrazolone,
1-(2'-, 3'- or 4'-nitrophenyl)-3-methyl-5-pyrazolone,
1-(2':5'- or 3':4'-dichlorphenyl)-3-methyl-5-pyrazolone,
1-(2'-, 3'- or 4'-sulphamylphenyl)-3-methyl-5-pyrazolone,
3-methyl-5-pyrazolone,
1-(2'-, 3'- or 4'-methylsulphonylphenyl)-3-methyl-5-pyrazolone,
1-phenyl-5-pyrazolone-3-carboxycresidide,
1-phenyl-5-pyrazolone-3-carboxy-2'-toluidide,
1-phenyl-5-pyrazolone-3-carboxyanilide,
1:3-diphenyl-5-pyrazolone,
1-(2'-, 3'- or 4'-N-methylsulphamylphenyl)-3-methyl-5-pyrazolone,
1-(2'-, 3'- or 4'-N:N-diethylsulphamylphenyl)-3-methyl-5-pyrazolone,
acetoacetanilide,
acetoacet-o-anisidide and
acetoacetanilide-4-sulphonamide, phenols such as p-cresol, 3:4- or 2:4-dimethylphenol,
2- or 3-acetylamino-4-methylphenol,
4-t-butylphenol,
4-thiocyanophenol,
4-sulphamyl-phenol,
4-acetylphenol,
2-hydroxy-5:6:7:8-tetrahydronaphthalene,
2-hydroxy-3-sulphamyl-5:6:7:8-tetrahydronaphthalene,
4-methoxyphenol,
2-carboethoxyamino-4-methylphenol,
o- and p-phenylphenol,
2-hydroxydiphenyleneoxide and
2:4-dihydroxyquinoline, naphthols such as 2-naphthol,
1-acetylamino-,
1-propionylamino-, 1-benzenesulphonylamino-,
1-carbomethoxyamino-,
1-carboethoxyamino-,
1-carboisopropoxyamino-, and 1-phenylamino-7-naphthols,
6-acetyl-2-naphthol,
4-acetyl-1-naphthol,
1-naphthol-3-, 4- or 5-sulphonamide,
2-naphthol-3-, 4-, 5-, 6-, 7- or 8-sulphonamide,
5:8-dichlor-1-naphthol,
5-chloro-1-naphthol,
1:5-dihydroxynaphthalene,
1-acetylamino-4-, 5- or 6-naphthol and
2-acetylamino-7-naphthol.

As examples of coupling components which already contain a group of Formula 2, there may be mentioned for example, 2-naphthol-6-$\beta$-hydroxyethylsulphone,
1-naphthol-4-$\beta$-hydroxyethylsulphone,
1-(3'- or 4'-$\beta$-hydroxyethylsulphonylphenyl)-3-methyl-5-pyrazolone,
m-(N:N-diethylamino)benzenesulphon-N-$\beta$-hydroxyethylamide,
m-(N:N-dimethylamino)-benzenesulphon-N-$\beta$-hydroxyethylamide,
m-(N:N-diethylamino)-phenyl-$\beta$-hydroxyethylsulphone,
1-(3'- or 4'-$\beta$-hydroxyethylsulphamylphenyl)-3-methyl-5-pyrazolone,
2-naphthol-6-$\beta$-hydroxyethylsulphonamide,
2-naphthylamine-6-sulphon-$\beta$-hydroxyethylamide and
6-$\beta$-hydroxyethylsulphonyl-2-naphthylamine.

These coupling components may alternatively be coupled with diazo components which do not contain a group of Formula 2 for example 2-aminophenol,
4-, 5- or 6-chlor-2-aminophenol,
4-, 5- or 6-nitro-2-aminophenol,
4:6-dinitro-2-aminophenol,
4-chlor-5-nitro-2-aminophenol,
2-aminophenol-4-sulphonamide,
2-aminophenol-4-sulphon-N-methylamide,
2-aminophenol-4-sulphon-N:N-diethylamide,
2-aminophenol-4-methyl-, -4-ethyl- and -4-propyl-sulphones,
2-aminophenol-4-sulphonanilide,
anthranilic acid,
4- and 5-nitroanthranilic acids,
4-chloroanthranilic acid,
2-aminobenzoic acid-4-sulphonamide,
2-aminobenzoic acid-4-methylsulphone,
4-methoxy-2-aminophenol,
4-methyl-2-aminophenol,
2-aminophenol-4-sulphonmorpholide,
aniline,
o- and p-nitroanilines,
o- and p-chloranilines,
o- and p-aminobenzonitriles,
4-amino-3-chlorbenzonitrile,
2:4-dicyanoaniline,
2-chlor-4-nitroaniline,
2-aminobenzthiazole,
o-, m- and p-toluidines,
o-, m- and p-anisidines,
5-chlor-2-aminoanisole and
4-chloro-2-trifluoromethylaniline.

Anthraquinone dyestuffs which may be used as starting materials for the above process of the invention may also be obtained, for example, by condensation of an anthraquinone carrying a halogen atom in an alpha position with an aromatic amine containing a group of Formula 2 above; thus 1-amino-4-bromo-anthraquinone may be condensed with, for example, 3- or 4-$\beta$-hydroxyethylsulphonyl aniline or a $\beta$-hydroxyethylsulphamylaniline. Alternatively, in place of 1-amino-4-bromoanthraquinone there may be used 1-amino-4-bromoanthraquinone-2-sulphonic acid, which is condensed with the amine, the product obtained then being subjected to a reduction process to remove the sulphonic acid group.

Dyestuffs of the o-nitrodiphenylamine series which may be used as starting materials for the above process of the invention may also be obtained for example by condensing a o-halogenonitrobenzene containing a group of Formula 2 above attached to the nucleus, for example 4-chloro-3-nitrophenyl-$\beta$-hydroxyethylsulphone or 4-chloro-3-nitrobenzenesulphon-$\beta$-hydroxyethylamide, with a primary aromatic amine of the benzene series for example aniline, a toluidine, an anisidine, an aminodiphenyl, a carbonamidoaniline, an alkylsulphonylaniline, a halogenated aniline or a phenylenediamine.

It is to be understood that in all these methods for obtaining dyestuffs suitable for use as starting materials for the above process of the invention, the intermediates are so chosen as to yield finally a dyestuff which is free from sulphonic acid groups or from carboxylic acid groups which do not form part of a metal-complex system.

The above process of the invention may conveniently be carried out by dissolving the anhydride or acid halide of an acid of formula Y.CO$_2$H and the dyestuff in a liquid tertiary amine such as pyridine and when the reaction is complete, pouring the reaction mixture into water to isolate the product.

As examples of anhydrides or acid halides of the acid of formula Y.COOH which may be used in the above process of the invention there may be mentioned acetic anhydride, acetyl chloride, acetyl bromide, propionyl chloride, butyryl chloride, benzoyl chloride, benzoyl bromide, toluyl chloride, methoxybenzoyl chloride, chlorobenzoyl chloride, nitrobenzoyl chloride and chloroacetyl chloride.

The new dyestuffs of the invention may also be obtained by reacting together dyestuff intermediates which already contain a group of Formula 1. Thus for example azo dyestuffs may be obtained by diazotising a primary amine and coupling the resulting diazo compound with a coupling component, the primary amine and/or the coupling component containing a group of Formula 1. As examples of primary amines which contain a group of Formula 1 there may be mentioned 4-$\beta$-acetoxyethylsulphonylaniline, 2-chloro-5-$\beta$-acetoxyethylsulphonylaniline, 2-amino-4-$\beta$-acetoxyethylsulphonylphenol, 3-($\beta$-acetoxyethylsulphonylmethyl)-4-methylaniline and 4-$\beta$-benzoyloxyethylsulphonylaniline, and as examples of coupling components which contain a group of Formula 1 there may be mentioned 4-$\beta$-acetoxyethylsulphonyl-1-naphthol.

A preferred class of the new dyestuffs of the invention are those dyestuffs which contain one or two groups of the formula:

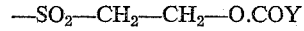

wherein Y has the meaning stated above. It is however preferred that Y represents a lower alkyl radical or a monocyclic aryl radical.

A second preferred class of the new dyestuffs of the invention are the dyestuffs which are represented by the formula:

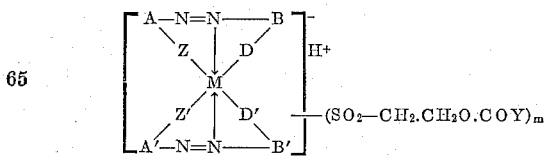

wherein A and A' each represent a substituted or unsubstituted phenylene or naphthylene radical and may be the same or different, B and B' which may be the same or different each represent the residue of a coupling component which couples in ortho or vicinal position to D or D', Z and Z' each represent —O— or —COO— and may be the same or different, D and D' each represent —O— or —NH— and may be the same or different, M represents a chromium or cobalt atom, $m$ represents 1, 2, 3 or 4, and Y has the meaning stated above, provided that A, A', B, B' and Y are free from sulphonic and carboxylic acid groups.

As examples of substituents which may be present in A and A' there may be mentioned lower alkyl radicals such as the methyl radical, lower alkoxy radicals such as methoxy and ethoxy radicals, chlorine, bromine, nitro, alkylsulphonyl for example methylsulphonyl, ethylsulphonyl and propylsulphonyl, acylamino for example acetylamino, benzoylamino, carbomethoxyamino and carboethoxyamino, sulphamyl and substituted sulphamyl groups such as N-methylsulphamyl, N-phenylsulphamyl, N:N-diethylsulphamyl and N-benzoylsulphamyl.

The residues of the coupling components represented by B and B' are the residues of any coupling components which will couple in ortho or vicinal position to a hydroxy or amino group, but B and B' are preferably the residues of a phenol, naphthol, acylacetarylide, 5-aminopyrazole or 5-pyrazolone.

The dyestuffs of this preferred class may be obtained by treating one or two azo compounds of the formula:

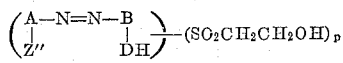

wherein A, B and D have the meanings stated above, $p$ represents 0, 1 or 2 and Z'' represents a —OH, —COOH or —O alkyl group which is in ortho position to the azo group, with an agent yielding chromium or cobalt and with an anhydride or acid halide of an acid of the formula Y.COOH, provided that at least one of the said azo compounds contains at least one —SO$_2$CH$_2$CH$_2$OH group.

The azo compound can be treated with the anhydride or acid halide of the said acid and the resulting compound subsequently treated with the agent yielding chromium or cobalt, but it is preferred to treat the azo compound with the agent yielding chromium or cobalt and to subsequently treat the metallised azo compound with the anhydride or acid halide of the said acid.

The said azo compounds may themselves be obtained by diazotising a primary amine of the formula:

wherein A has the meaning stated above and Z'' represents a —OH, —COOH or —O alkyl group which is in ortho position to the —NH$_2$ group, and coupling the diazo compound so obtained with a coupling component of the formula:

wherein B and D have the meanings stated above, the primary amine and/or the coupling component being so chosen that the resulting azo compound contains 0, 1 or 2 groups of the formula —SO$_2$—CH$_2$CH$_2$OH and is free from sulphonic acid groups and carboxylic acid groups other than a carboxylic acid group represented by Z''.

It is however preferred that A is the same as A', B is the same as B', D is the same as D' and Z is the same as Z'.

The new dyestuffs of the invention are valuable for dyeing natural and artificial textile materials, for example cellulose materials such as cotton and linen, natural protein materials such as wool, silk and leather, regenerated cellulose materials such as viscose rayon, cellulose esters as secondary cellulose acetate and triacetate rayons and textile materials made from synthetic polymers, for example textile materials made from polyamides such as nylon, polyurethanes, polymers and co-polymers of acrylonitrile, polyesters such as polyethylene terephthalate and the polymer from caprolactam. The dyestuffs may be applied from neutral, weakly acid or weakly alkaline dyebath or they may be applied by processes in which the pH of the dyebath is varied at any stage during the application process by the addition of acids or acid salts or alkalis or alkaline salts.

Those new dyestuffs which are insoluble in water are preferably used in the form of an aqueous dispersion which may be obtained by milling the dyestuff in water, preferably in the presence of a dispersing agent. If desired the aqueous dispersions may be converted, by known methods, into redispersible powders.

When applied to textile materials the new dyestuffs yield level colourations in a wide range of shades which possess excellent fastness to light, to wet treatments and to dry heat treatments.

The invention is illustrated but not limited by the following examples in which parts and percentages are by weight:

*Example 1*

A mixture of 40.2 parts of the monoazo compound which is obtained by coupling diazotised 2-amino-4-β-hydroxyethylsulphonylphenol with 1-phenyl-3-methyl-5-pyrazolone in the presence of sodium carbonate, 14.5 parts of chromium acetate and 500 parts of 50% aqueous alcohol is heated at the boil under a reflux condenser until metallisation of the monoazo compound is complete. The solution so obtained is poured into a 10% aqueous solution of sodium chloride and the metallised azo compound which is precipitated is filtered off and dried.

A mixture of 43.7 parts of the above metallised azo compound, 20 parts of acetic anhydride and 300 parts of pyridine is stirred for 5 hours at room temperature. The solution so obtained is poured onto a mixture of 200 parts of ice and 300 parts of water and 50 parts of sodium chloride are then added. The precipitated dyestuff is then filtered off and dried.

The new chromium-containing azo dyestuff so obtained when applied to wool from a neutral or weakly acid dyebath yields orange shades which have excellent fastness to washing, milling, potting, acid-cross-dyeing, rubbing and to light.

The same dyestuff is obtained using acetyl chloride in place of the acetic anhydride.

*Example 2*

A mixture of 35.6 parts of the monoazo compound which is obtained by coupling diazotised 4-β-hydroxyethylsulphonylaniline with β-naphthol in the presence of sodium carbonate, 356 parts of pyridine and 20 parts of acetic anhydride are stirred for 5 hours at room temperature. The solution so obtained is poured on to a mixture of 200 parts of ice, 400 parts of water and 60 parts of sodium chloride and then added. The precipitated dyestuff is filtered and dried.

The new monoazo dyestuff so obtained when applied to wool or nylon from an aqueous dispersion yields orange shades possessing excellent fastness to washing.

The following table gives further examples of the new dyestuffs of the invention which are obtained when the 40.2 parts of the monoazo compound used in Example 1 are replaced by equivalent amounts of the monoazo compounds obtained by diazotising the amines listed in the second column of the table and coupling with the coupling components listed in the third column of the table, and/or the 14.5 parts of chromium acetate used in Example 1 are replaced by equivalent amounts of the acetates of the metals listed in the fourth column of the table, and/or the 20 parts of acetic anhydride used in Example 1 are replaced by equivalent amounts of the acylating agents listed in the fifth column of the table. The sixth column of the table indicates the shades obtained when the dyestuffs are applied to wool from a neutral or slightly acid dyebath.

by the method described in Example 1 a dyestuff is obtained which is identical with the dyestuff of Example 13.

The following table gives further examples of the new dyestuffs of the invention which are obtained when the 35.6 parts of the monoazo compound used in Example 2

| Example | Amine | Coupling component | Metal | Acylating agent | Shade |
|---|---|---|---|---|---|
| 3 | 2-amino-4-β-hydroxyethylsulphonylphenol | Acetoacetanilide | Cobalt | Acetic anhydride | Yellow. |
| 4 | do | Acetoacet-o-anisidide | do | do | Do. |
| 5 | do | 1-phenyl-3-methyl-5-pyrazolone | Chromium | Benzoyl chloride | Orange. |
| 6 | do | 1-(3'-dimethylsulphamyl) phenyl-3-methyl-5-pyrazolone | do | Acetic anhydride | Do. |
| 7 | do | 1-phenyl-3-(2'-methoxy-5'-methylphenyl) carbamyl-5-pyrazolone | do | do | Red. |
| 8 | do | 1-phenyl-3-(2'-methylphenyl)-carbamyl-5-pyrazolone | do | do | Red. |
| 9 | do | 1-(2'-chlorophonyl-3-methyl-5-pyrazolone | do | do | Orange. |
| 10 | do | 1-(2':5'-dichlorophenyl-3-methyl-5-pyrazolone | do | do | Do. |
| 11 | do | 5:6:7:8-tetrahydro-2-naphthol | do | do | Bluish-brown. |
| 12 | do | do | Cobalt | do | Reddish-brown. |
| 13 | do | β-Naphthol | Chromium | do | Violet. |
| 14 | do | do | Cobalt | do | Bordeaux. |
| 15 | do | 1-carboisoproxyamino-7-naphthol | Chromium | do | Grey. |
| 16 | do | 1-carboethoxyamino-7-naphthol | do | do | Do. |
| 17 | do | 1-benzamido-7-naphthol | Cobalt | do | Violet. |
| 18 | do | do | Chromium | do | Grey. |
| 19 | do | 6-acetyl-2-naphthol | Cobalt | do | Bordeaux. |
| 20 | 2-amino-4-β-hydroxyethylsulphamylphenol | 1-phenyl-3-methyl-5-pyrazolone | Chromium | do | Orange. |
| 21 | 2-amino-4-β-hydroxyethylsulphonylphenol | do | do | Acetyl chloride | Do. |
| 22 | do | β-Naphthol | Cobalt | do | Bordeaux. |
| 23 | do | 1-carboethoxyamino-7-naphthol | Chromium | do | Grey. |
| 24 | do | do | do | Chloroacetyl chloride | Do. |
| 25 | do | 1-phenyl-3-methyl-5-pyrazolone | Cobalt | Acetic anhydride | Yellow. |
| 26 | do | β-Naphthol | do | Benzoyl chloride | Bordeaux. |
| 27 | do | do | do | Propionyl chloride | Do. |
| 28 | do | do | do | p-Nitrobenzoyl chloride | Do. |
| 29 | do | do | do | Crotonyl chloride | Do. |
| 30 | do | do | Chromium | Benzoyl chloride | Violet. |
| 31 | do | 1-phenyl-3-methyl-5-pyrazolene | do | Chloroacetyl chloride | Orange. |
| 32 | do | do | do | Dichloroacetyl chloride | Do. |
| 33 | do | do | do | B-Chloropropionyl chloride | Do. |
| 34 | do | do | Cobalt | Benzoyl chloride | Yellow. |
| 35 | do | 1-naphthol-3-sulphonamide | do | do | Violet. |
| 36 | do | 1-phenyl-3-carbon-N-(2'-methoxy-5'-methylphenyl)amido-5-pyrazolone | Chromium | do | Red. |
| 37 | do | acetoacetanilide | Cobalt | do | Yellow. |
| 38 | do | 5:6:7:8-tetrahydro-2-naphthol | do | do | Reddish-brown. |
| 39 | do | 1-carboethoxyamino-7-naphthol | Chromium | do | Grey. |
| 40 | do | β-Naphthylamine | Cobalt | do | Do. |
| 41 | do | 1-phenylamino-7-naphthol | Chromium | do | Green. |
| 42 | do | do | Cobalt | do | Olive. |
| 43 | do | 1-(3'-β-hydroxyethylsulphonyl-phenyl)-3-methyl-5-pyrazolone | Chromium | do | Orange. |
| 44 | Anthranilic acid | do | do | do | Yellow. |
| 45 | 2-amino-4-sulphon-N-methyl-N-β-hydroxyethylamidophenol | 1-phenyl-3-methyl-5-pyrazolone | do | Acetic anhydride | Orange. |
| 46 | 6-nitro-1-amino-2-naphthol-4-sulphonamide | 1-(4'-β-hydroxyethylsulphonyl-phenyl)-3-methyl-5-pyrazolone | do | Butyryl chloride | Red. |
| 47 | 6-nitro-2-amino-4-β-hydroxyethylsulphonylphenol | 5:8-dichloro-1-naphthol | do | Benzoyl chloride | Grey. |
| 48 | do | 1-carboethoxyamino-7-naphthol | do | do | Do. |
| 49 | 2-amino-5-sulphonamide | 1-(3'-β-hydroxyethylsulphonyl-phenyl)-3-methyl-5-pyrazolone | do | do | Red. |
| 50 | 5-chloro-2-aminophenol | do | do | do | Orange. |
| 51 | 2-amino-5-β-hydroxyethylsulphonylphenol | 1-phenyl-3-methyl-5-pyrazolone | do | do | Red. |
| 52 | 1-amino-6-β-hydroxyethylsulphonyl-2-naphthol | β-Naphthol | do | Acetic anhydride | Navy blue. |
| 53 | 2-amino-4-sulphon-N-β-hydroxyethylamidophenol | 1-phenyl-3-methyl-5-pyrazolone | do | Benzoyl chloride | Orange. |
| 54 | 2-amino-4-sulphon-N-β-hydroxyethylamido-6-nitrophenol | β-Naphthol | do | Acetic anhydride | Grey. |
| 55 | 2-amino-4-sulphon-N:N-di(β-hydroxyethyl)amidophenol | 1-(2'-methylphenyl)-3-methyl-5-pyrazolone | do | do | Orange. |
| 56 | 2-amino-4-sulphon-(N-β-hydroxyethyl-N-m-chlorophenyl)amidophenol | 1-(3'-sulphamylphenyl)-3-methyl-5-pyrazolone | do | do | Do. |

*Example 57*

A mixture of 38.2 parts of the monoazo compound, which is obtained by coupling diazotised 2-methoxy-5-β-hydroxyethylsulphonylaniline with β-naphthol, 2400 parts of ethylene glycol, 400 parts of water and 21 parts of chromium acetate is stirred at the boil under a reflux condenser for 35 hours. 5000 parts of a 10% aqueous solution of sodium chloride are added and the precipitated chromium complex is filtered off and dried. When the said chromium complex is treated with acetic anhydride are replaced by equivalent amounts of the monoazo compounds obtained by diazotising the amine listed in the second column of the table and coupling with the coupling components listed in the third column of the table, and/or the 20 parts of acetic anhydride used in Example 2 are replaced by equivalent amounts of the acylating agents listed in the fourth column of the table. The fifth column of the table indicates the shades obtained when the dyestuffs are applied to wool or to polyamide textile materials.

| Example | Amine | Coupling Component | Acylating agent | Shade |
|---------|-------|---------------------|-----------------|-------|
| 58 | p-β-Hydroxyethylsulphonylaniline | β-Naphthol | Benzoyl chloride | Orange. |
| 59 | ----do---- | 1-acetamido-7-naphthol | Acetic anhydride | Do. |
| 60 | ----do---- | Acetoacetanilide | ----do---- | Yellow. |
| 61 | ----do---- | 1-(3'-chlorophenyl)-3-methyl-5-pyrazolone | ----do---- | Do. |
| 62 | ----do---- | 1-phenyl-3-methyl-5-pyrazolone | ----do---- | Do. |
| 63 | 2-amino-4-β-hydroxyethylsulphonyl-phenol | ----do---- | ----do---- | Do. |
| 64 | 2:4-bis(methanesulphenyl)aniline | 6-(β-hydroxyethylsulphonyl)-2-naphthylamine | Acetyl chloride | Bluish-red. |
| 65 | 2-methoxy-5-(β-hydroxyethylsulphenyl)aniline | ----do---- | ----do---- | Orange. |
| 66 | 2-chloro-5-methylsulphenyl aniline | 3-(N:N-diethylamino)benzenesulphon-N-β-hydroxyethylamide | ----do---- | Do. |
| 67 | p-nitroaniline | ----do---- | ----do---- | Do. |

*Example 68*

A mixture of 15.8 parts of 3-nitro-4-chlorobenzene-β-acetoxyethylsulphone, 7 parts of aniline, 17.5 parts of calcium carbonate and 150 parts of ethanol is stirred at the boil under a reflux condenser for 22 hours. The mixture is then filtered and the filtrate is cooled. The precipitated 2-nitrodiphenylamine-4-β-acetoxyethylsulphone is then filtered off and dried.

The dyestuff so obtained, when dispersed in aqueous medium dyes polyamide textile materials in yellow shades possessing very good fastness to wet treatments.

The 3-nitro-4-chlorobenzene-β-acetoxyethylsulphone used in the above example may be obtained by treating the sodium salt of 3-nitro-4-chlorobenzenesulphinic acid with ethylene chlorohydrin in aqueous medium and acylating the resulting compound.

*Example 69*

21 parts of acetic anhydride are added to a solution of 16.4 parts of 2-nitrodiphenylamine-4-sulphon-N-(β-hydroxyethyl)amide in 300 parts of pyridine and the resulting mixture is stirred for 5 hours at 25° C. The mixture is then poured into a solution of 75 parts of sodium chloride in 500 parts of water and the oil which is obtained is separated off and dried under reduced pressure. The residue crystallises from ether in the form of yellow crystals which melt at 106° C.

When applied to polyamide textile materials the dyestuff yields yellow shades possessing very good fastness to wet treatments.

The 2-nitrodiphenylamine-4-sulphon-N-(β-hydroxyethyl)-amide used in the above example may be obtained as follows:

A mixture of 18 parts of 3-nitro-4-chlorobenzenesulphon-N-(β-hydroxyethyl)amide, 6.5 parts of aniline, 20 parts of calcium carbonate and 200 parts of ethanol is stirred at the boil under a reflux condenser for 30 hours. The mixture is then filtered and the filtrate is distilled to remove the ethanol. The residual oil is poured into 800 parts of water and the precipitated solid is filtered off and dried. The product melts at 86° C.

*Example 70*

A mixture of 38 parts of 1-amino-4-[4'-(β-hydroxy-ethylsulphonyl)anilino]anthraquinone, 186 parts of pyridine and 18.5 parts of acetic anhydride is stirred for 5 hours at 5° C. 800 parts of ether are then added and the precipitated dyestuff is filtered off and dried.

The dyestuff so obtained, when dispersed in aqueous medium, dyes polyamide textile materials in reddish-blue shades which possess very good fastness to washing.

*Example 71*

A mixture of 5 parts of 1-amino-4-[3'-(β-hydroxyethylsulphonyl)anilino]anthraquinone, 24.5 parts of pyridine and 3 parts of acetic anhydride is stirred for 4 hours at 5° C., and the resulting solution is then poured into a mixture of 100 parts of ice and 150 parts of water. The precipitated dyestuff is then filtered off, washed with water and dried.

The dyestuff so obtained, when dispersed in aqueous medium, dyes polyamide textile materials in reddish-blue shades which possess very good fastness to washing.

*Example 72*

In place of the 38 parts of the anthraquinone compound used in Example 70 there are used 31 parts of 1-amino-4-[3'-(sulphon-N-β-hydroxyethylamido)anilino]anthraquinone or 36 parts of 1-methylamino-4-[4'-methyl-2'-(sulphon-N-β-hydroxyethylamido)anilino]anthraquinone when dyestuffs are obtained which dye polyamide textile materials in reddish-blue and greenish-blue shades respectively which possess good fastness to washing.

*Example 73*

In place of the 5 parts of the anthraquinone compound used in Example 71 there are used 6 parts of 1-amino-4-[3'-(sulphon-N-methyl-N-β-hydroxyethylamido)anilino]anthraquinone or 6 parts of 1-amino-4-[4'-methyl-2'-(sulphon-N-α-methyl-β-hydroxyethylamido)anilino]anthraquinone or 7 parts of 1-amino-2-bromo-4-[4'-methyl-2'-(sulphon-N-α-ethyl-β-hydroxyethylamido)anilino]anthraquinone when dyestuffs are obtained which dye polyamide textile materials in blue, reddish-blue and reddish-blue shades respectively which possess good fastness to washing.

*Example 74*

A solution of 6.9 parts of sodium nitrite in 50 parts of water is added to a solution of 24.3 parts of 4-(β-acetoxyethylsulphonyl)aniline (which may be obtained as described below) in a mixture of 400 parts of water and 25 parts of a 36% aqueous solution of hydrochloric acid, the temperature of the resulting mixture being maintained between 0° and 5° C. by external cooling. The mixture is stirred for 15 minutes at this temperature, and is then added, during 10 minutes, to a solution of 13.4 parts of p-cresol, 4 parts of sodium hydroxide and 10.7 parts of sodium carbonate in 400 parts of water which has been cooled to 2° C. The mixture is stirred for 3 hours at this temperature and the precipitated dyestuff is then filtered off, washed with water and dried.

The dyestuff so obtained, when dispersed in aqueous medium, dyes polyamide textile materials in yellow shades which possess very good fastness to wet treatments.

The 4-(β-acetoxyethylsulphonyl)aniline used in the above example may be obtained by condensing 4-nitrothiophenol with β-chloroethyl alcohol to give 4-nitrophenyl-β-hydroxyethyl sulphide (melting point 60° to 62° C.), treating with acetic anhydride to yield 4-nitrophenyl-β-acetoxyethylsulphide which is oxidised to 4-nitrophenyl-β-acetoxyethylsulphone (melting point 122° to 124° C.), which is finally reduced to 4-(β-acetoxyethylsulphonyl) aniline which melts between 95° and 96° C.

*Example 75*

24.3 parts of 4-(β-acetoxyethylsulphonyl)aniline are diazotised by the method described in Example 74 and the resulting solution of the diazo compound is added, during 15 minutes, to a solution of 19.5 parts of N:N-di(β-hydroxyethyl)-m-toluidine in a mixture of 400 parts of water and 12 parts of a 36% aqueous solution of hydrochloric acid, which has been cooled to 2° C. The resulting mixture is stirred for 24 hours at 2° C., 28 parts of a 30% aqueous solution of sodium acetate are added and the mixture is stirred for a further 4½ hours. The precipitated dyestuff is then filtered off, washed with water and dried.

The dyestuff so obtained, when dispersed in aqueous medium dyes polyamide and woollen textile materials in reddish-orange shades which possess good fastness to washing.

*Example 76*

In place of the 19.5 parts of N:N-di(β-hydroxyethyl)-m-toluidine used in Example 75 there are used 19.6 parts of N-β-cyanoethyl-1-naphthylamine whereby a dyestuff is obtained which dyes polyamide and woollen textile materials in red shades possessing very good fastness to washing.

*Example 77*

A solution of 6.9 parts of sodium nitrite in 50 parts of water is added to a solution of 2-chloro-5-(β-acetoxyethylsulphonyl)aniline in a mixture of 240 parts of acetic acid and 25 parts of a 36% aqueous solution of hydrochloric acid, the temperature of the resulting mixture being maintained at 5° C. by external cooling. The mixture is stirred for 10 minutes at this temperature and is then added to a solution of 19.5 parts of N:N-di(β-hydroxyethyl)-m-toluidine in a mixture of 400 parts of water and 12 parts of a 36% aqueous solution of hydrochloric acid, which has been cooled to 5° C. The mixture is stirred for 24 hours at 5° C., 46 parts of a 30% aqueous solution of sodium acetate are added and the mixture is stirred for a further 8 hours. The precipitated dyestuff is then filtered off, washed with water and dried.

The dyestuff so obtained, when dispersed in aqueous medium dyes polyamide and woollen textile materials in reddish-orange shades which possess very good fastness to washing.

In place of the 19.5 parts of N:N-di(β-hydroxyethyl)-m-toluidine used in the above Example there are used 18.7 parts of N-β-hydroxyethyl-1-naphthylamine whereby a dyestuff is obtained which dyes polyamide and woollen textile materials in red shades possessing very good fastness to washing.

The 2-chloro-5-(β-acetoxyethylsulphonyl)aniline used in the above Example may be obtained by converting 3-nitro-4-chlorobenzenesulphonchloride to the corresponding sulphinic acid, condensing with ethylene chlorohydrin, treating with acetic anhydride and finally reducing the nitro group to an amino group.

*Example 78*

0.7 part of sodium nitrite is dissolved in 10 parts of sulphuric acid at a temperature of 25° C., and the resulting solution is added to a suspension of 2.58 parts of 2-amino-6-(β-hydroxyethylsulphonyl)aniline (which may be obtained as described below) in a mixture of 16 parts of sulphuric acid and 3 parts of water, the temperature of the mixture being maintained between −10° and −5° C. by external cooling. 20 parts of water are then added, the temperature of the mixture being maintained at 0° C. by external cooling, and the mixture is stirred at 0° C. for 30 minutes. The resulting mixture is added to a solution of 2.79 parts of N:N-bis(β-acetoxyethyl)-m-toluidine in a mixture of 50 parts of water, 5 parts of a 2 N aqueous solution of hydrochloric acid and 50 parts of acetone, the temperature being maintained between 0° and 10° C. by external cooling. The mixture is stirred for 30 minutes at this temperature and the precipitated azo compound is filtered off and dried. The resulting solid is dissolved in 25 parts of pyridine, 3 parts of acetic anhydride are added and the mixture is stirred at the boil under a reflux condenser for 1 hour. 400 parts of water are then added and the precipitated dyestuff is filtered off, washed with water and dried.

The dyestuff so obtained, when dispersed in aqueous medium, dyes cellulose acetate textile materials in bluish-red shades possessing very good fastness to light.

In place of the 2.79 parts of N:N-bis(β-acetoxyethyl)-m-toluidine used in the above example there are used 1.99 parts of N:N-bis(β-cyanoethyl)aniline or 2.18 parts of N-β-cyano-ethyl-N-β'-methoxyethyl-m-toluidine when dyestuffs are obtained which dye cellulose acetate textile materials in scarlet and bluish-red shades respectively which possess very good fastness to light.

The 2-amino-6-(β-hydroxyethylsulphonyl)benzthiazole used in the above example may be obtained as follows:

A solution of 31.2 parts of bromine in 50 parts of acetic acid is added during 30 minutes, to a solution of 40 parts of 4-(β-hydroxyethylsulphonyl)aniline and 40 parts of potassium thiocyanate in 320 parts of acetic acid, and the resulting mixture is stirred for 24 hours at 20° C. The precipitated solid is then filtered off and the solid is stirred with 1000 parts of a 2 N aqueous solution of hydrochloric acid for 6 hours at the boil under a reflux condenser. The mixture is filtered and sodium carbonate is added to the filtrate until it is alkaline. The mixture is then cooled to 20° C., and the precipitated solid is filtered off, washed with water and dried. The 2-amino-6-(β-hydroxyethylsulphonyl)benzthiazole melts at 181° to 182° C.

*Example 79*

A mixture of 20.1 parts of the monoazo compound obtained by coupling diazotised 2-aminophenol-4-β-hydroxyethyl-sulphone with 1-phenyl-3-methyl-5-pyrazolone, 19.3 parts of the monoazo compound obtained by coupling diazotised 4-chloro-2-aminophenol with 1-carboethoxyamino-7-naphthol, 500 parts of ethanol, 500 parts of ethylene glycol, 200 parts of water and 14.5 parts of chromium acetate is stirred at the boil under a reflux condenser for 16 hours. The resulting solution is cooled to 20° C., 400 parts of a 10% aqueous solution of sodium chloride are added and the metallised azo compound which is precipitated is filtered off and dried.

A mixture of the above metallised azo compound, 12 parts of acetic anhydride and 400 parts of pyridine is stirred for 20 hours at a temperature between 10° and 15° C. The resulting solution is then poured into a mixture of 400 parts of ice and 400 parts of water and 80 parts of sodium chloride are added. The precipitated dyestuff is then filtered off and dried. The dyestuff so obtained when applied to wool from a neutral or slightly acid dyebath yields brown shades which possess excellent fastness to washing, to milling and to light.

*Example 80*

In place of the 19.3 parts of the monoazo compound obtained by coupling diazotised 4-chloro-2-aminophenol with 1-carboethoxyamino-7-naphthol used in Example 79 there are used 24 parts of the monoazo compound obtained by coupling diazotised 2-amino-4-β-hydroxyethyl-sulphone with 2-naphthol-4-β-hydroxyethylsulphone and in place of the 12 parts of acetic anhydride used in Example 79 there are used 37 parts of acetic anhydride whereby a dyestuff is obtained which dyes wool from a neutral or slightly acid dyebath in brown shades which possess excellent fastness to washing, to milling and to light.

What we claim is:

1. Metallized azo dyestuffs of the formula:

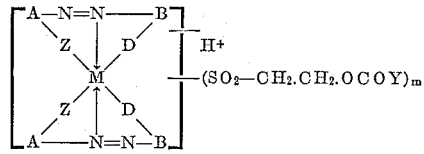

wherein:

A represents a member selected from the class consisting of phenylene and naphthylene diazo component radicals;

B represents the residue of an azo coupling component which couples is in a position adjacent the grouping represented by D, and selected from the group consisting of naphthol, 5-pyrazolone, naphthylamine, and acetoacetarylamide coupling components; lower alkoxy, acetyl, benzoylamino, phenyl, carbo And any substituents on A and B are selected from the group consisting of chlorine, nitro, lower alkyl, (lower alkoxy) amino, anilino, sulphamyl, dimethylsulphamyl, N-(2'-methylphenyl)carbamyl and N-(2'methoxy-5'-methylphenyl)carbamyl;

D represents a grouping selected from the class consisting of —O— and —NH—;

Z represents a grouping selected from the class consisting of —O— and —COO—;

M represents a metal atom selected from the class consisting of cobalt and chromium;

Y represents a radical selected from the class consisting of lower alkyl, chloro-lower alkyl, lower alkenyl, phenyl, and nitrophenyl; and, $m$ represents one of the numbers 2 and 4.

2. The 1:2 chromium complex of:

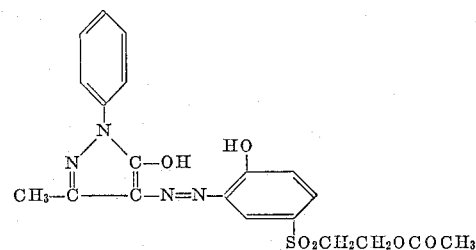

References Cited in the file of this patent

UNITED STATES PATENTS

| | | |
|---|---|---|
| 2,241,247 | Dickey | May 6, 1941 |
| 2,309,176 | Dreyfus | Jan. 26, 1943 |
| 2,336,275 | McNally et al. | Dec. 7, 1943 |

FOREIGN PATENTS

| | | |
|---|---|---|
| 1,002,099 | Germany | Feb. 7, 1957 |
| 1,012,010 | Germany | July 11, 1957 |